United States Patent [19]

Rudy

[11] Patent Number: 4,906,502

[45] Date of Patent: Mar. 6, 1990

[54] PRESSURIZABLE ENVELOPE AND METHOD

[75] Inventor: Marion F. Rudy, Northridge, Calif.

[73] Assignee: Robert C. Bogert, Marina Del Rey, Calif. ; a part interest

[21] Appl. No.: 147,131

[22] Filed: Feb. 5, 1988

[51] Int. Cl.⁴ .......................... B32B 1/04; A43B 13/20
[52] U.S. Cl. ...................................... 428/69; 428/71; 428/76; 428/86; 428/192; 428/250; 428/253; 428/261; 428/304.4; 428/318.4; 36/29; 36/43; 36/44; 128/383
[58] Field of Search ......................... 428/35, 71, 69, 76, 428/86, 250, 304.4, 188, 318.4, 192, 36.2, 73, 261; 36/29, 40, 594, 595, 38, 44, 43, 3 R, 71, 25 R; 128/383, 253, 68

[56] References Cited

U.S. PATENT DOCUMENTS

| | | | |
|---|---|---|---|
| 2,743,510 | 5/1956 | Mauney et al. | 244/135 B |
| 3,205,106 | 9/1965 | Cross | 428/318.4 |
| 3,616,126 | 11/1971 | Tungseth | 428/86 |
| 4,183,156 | 1/1980 | Rudy | 36/44 |
| 4,219,945 | 9/1980 | Rudy | 36/44 |
| 4,261,776 | 4/1981 | Lea et al. | 428/261 |
| 4,340,626 | 7/1982 | Rudy | 428/69 |
| 4,409,271 | 10/1983 | Pehr | 428/250 |
| 4,486,479 | 12/1984 | Geppert | 428/35 |
| 4,519,856 | 5/1985 | Lazzara | 428/63 |
| 4,590,689 | 5/1986 | Rosenburg | 36/38 |

Primary Examiner—Ellis P. Robinson
Assistant Examiner—Donald J. Loney
Attorney, Agent, or Firm—Beehler & Pavitt

[57] ABSTRACT

An internally pressurizable lightweight high tensile strength multi-layered envelope is provided. An outer barrier layer of elastomeric semi-permeable material is mechanically bonded at a multiplicity of cites where substantially the entire distal surfaces of a double-walled drop thread linked fabric. The composite structure defines a substantially flat thin lightweight product which is capable of withstanding very substantial pressures.

41 Claims, 1 Drawing Sheet

U.S. Patent        Mar. 6, 1990        4,906,502
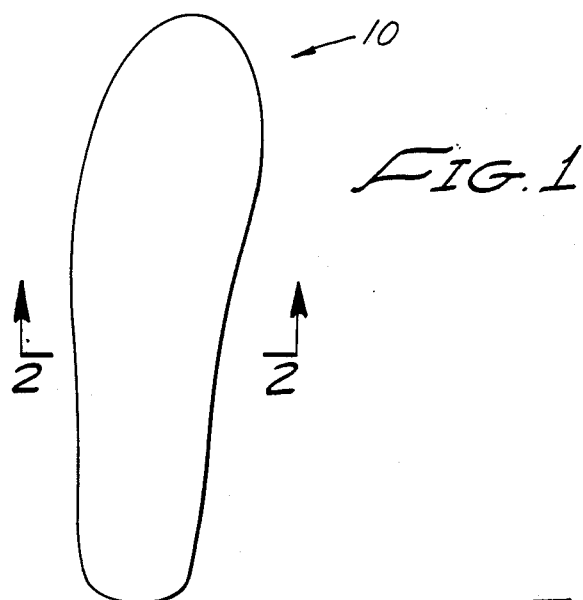
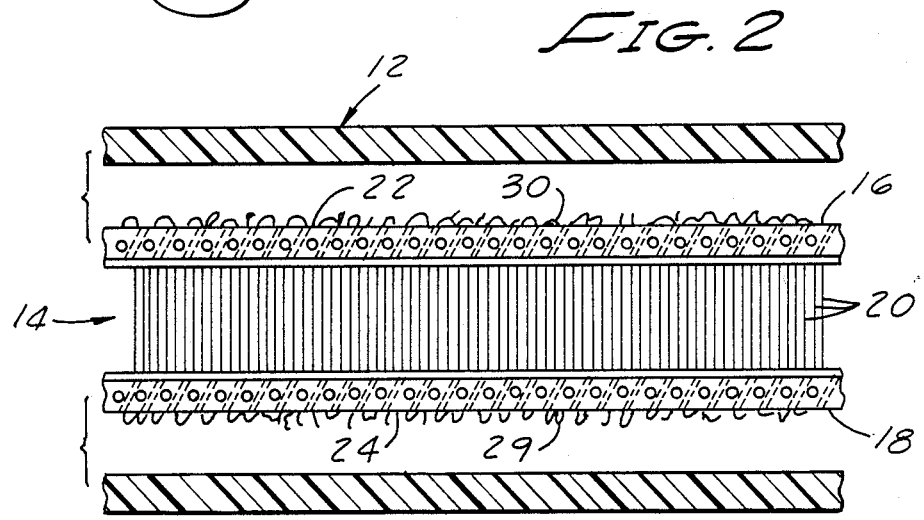
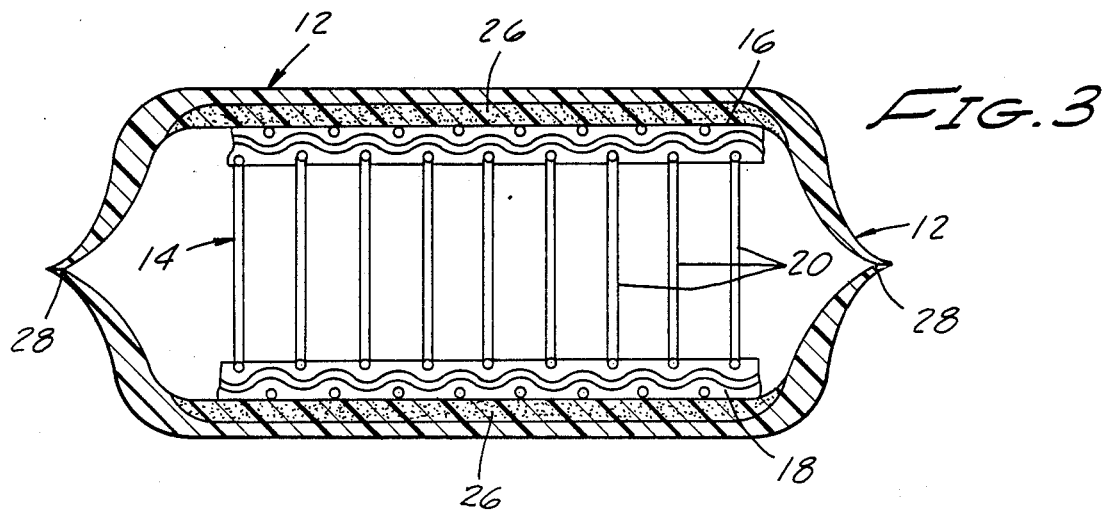

PRESSURIZABLE ENVELOPE AND METHOD

This invention relates to internally pressurizable multi-layered envelopes, and more particularly, to a multi-layered envelope which is particularly adapted for use as an insole in a shoe.

Previously considerable difficulty had been experienced in providing internally pressurizable multi-layered envelopes wherein the envelope is thin and of a substantially uniform thickness with the capacity of being pressurized to a level such that more than 40% of the energy of impact on the structure is returned in a beneficial, efficient and comfortable manner rather than being absorbed and dissipated in heat. Previous difficulty had been experienced in producing lightweight structures which possess a high degree of springiness. Previously considerable difficulty had been experienced in preventing aneurysms from occurring in lightweight pressurized multi-layer envelopes. Previously substantial difficulty had been encountered in providing large flat chambers which are substantially uniformly compressible over the load bearing areas while maintaining a substantially uniform thickness and avoiding the propensity for the formation of aneurysms.

These and other difficulties of the prior art have been overcome according to the present invention. The present invention provides a structure which comprises a hermetically sealed outer covering barrier layer which is bonded, at least partially through mechanical means, substantially all over the outer sides of a double walled fabric structure. The double walled fabric structure comprises first and second fabric layers which are normally spaced from one another for predetermined distance. Filaments, preferably in the form of yarn, extend internally between the proximal surfaces of the respective fabric layers. The transversely extending restraining means are anchored to the respective fabric layers. The restraining means function to maintain the general plainer form of the structure and the mechanical bonding of the outer covering to the distal sides of the respective fabric layer prevents the outer covering from peeling away from the distal surfaces and forming an aneurysm. The transversely extending yarns or filaments which function as the preferred restraining means are present in quantities sufficient to hold the structure in the desired plainer form without offering substantial resistance to the compression of the two-fabric layer towards one another. That is, the restraining means have very little compressive strength and very substantial tensile strength. The region between the proximal surfaces of the fabric layers is of sufficient openness to allow movement of the pressurizing gas throughout the pressurized chamber.

The hermetically sealed outer barrier layers is composed of an elastic semi-permeable material which is substantially impervious to those gases which are essentially inert and that have very large molecular sizes and is slightly permeable to oxygen. With this material, an inward diffusion of oxygen occurs from the ambient air which, by reason of partial pressures, tends to increase the total pressure within the enclosure. This is described in some detail in for example, Rudy, U.S. Pat. No. 4,340,626 patented Jul. 20, 1982; Rudy et al, U.S. Pat. No. 4,183,156 patented Jul. 15, 1980; Rudy et al, U.S. Pat. No. 4,271,606 patented Jun. 9, 1981; and Rudy et al, U.S. Pat. No. 4,219,945 patented Sept. 2, 1980. Attention is respectfully invited to these patents, which are hereby incorporated herein by reference, for a description as to the barrier film, the pressuring gas and the physical phenomenon which are involved in the diffusion of gas through the semi-permeable barrier layer.

The structures according to the present invention are particularly suited for use where they are required to cushion an impact and then return as much as possible of the energy of that impact. The unique ability of the device to return a substantial part of the otherwise wasted energy which is cushioned at impact, is greatly improved by designing the structure to have the absolute minimum mass, and the constraining walls to have a low hysterisis loss when flexed. Gas pressurized to at least 2 and preferably more than 15 psi, functions well to provide excellent cushioning and then returns the stored energy in a comfortable, resilient, life-like manner. When the structure of the present invention is pressurized to a level in excess of 40 to 50 psi the structures gives back as much as 90% of the energy of an impact. Thus, if a weight such as a steel ball is dropped on a structure of the present invention which is pressurized to a level of approximately 55 psi the ball will rebound to a height which is approximately 90% of the distance from which it was dropped.

The present invention is uniquely suited to footwear and other similar applications where high style and/or maximum cushion comfort, support and protection must be achieved in the very minimum thickness and space. Thicker devices as disclosed in Rudy U.S. Pat. No. 4,183,156, were, in large measure, poorly suited for this type of application. The hills can valleys of the earlier product, coupled with the need for some type of moderator to provide a smooth, comfortable support surface created a product that was too thick and clumsy for this very difficult type of application.

The flat plainer load bearing surfaces of the present invention achieve a completely new and unique degree of 100% "floating on air" cushioned, resilient support, comfort and protection never before possible. This invention eliminates the need for foam encapsulation. However, in certain circumstances it may be desirable to use foam in order to achieve the optimum benefits of both techniques.

In the present invention the formation of one or more aneurysms constitutes failure. Aneurysms can develop when there is delamination of the barrier material from the distal surfaces of the double-walled fabric, or by cutting; abrasion or tensile failure of the drop threads. The present invention solves these problems for the life of the product.

The use of drop threads in a double walled structure acting in tension to constrain and shape the barrier surfaces has been proposed previously. An example of the aneurysm which can develop when the drop threads are of insufficient strength or are deliberately severed, is illustrated for example in Cross, U.S. Pat. No. 3,205,106 patented Sept. 7, 1965. The use of drop threads and filaments as cushioning or stiffening members in double walled structures has been proposed, for example, by Tungseth, U.S. Pat. No. 3,616,126 patented Oct. 26, 1971 and Giese et al, U.S. Pat. No. 4,005,532 patented Feb. 1, 1977. These prior structures are comprised of a single heavy (i.e., large 0.003 to 0.025 inch diameter) plastic mono-filament thread woven into s stiff three-dimensional, compression load supportive mat. The Tungseth '126 patent describes a product of this type that relies completely on the buckling characteristics of select diameter plastic mono-filaments in the woven structure in order to absorb compression shock loads. No support is provided here by the ambient atmosphere surrounding said structure.

The Giese patent '532 likewise is a stiff compression load supporting mat woven from a 0.010" diameter mono-filament thread in order to form a thermal insulation insert for articles of footwear; wherein it is stated "The separating material" (i.e., threads) "is of such a strength as to prevent deformation of the mesh-like fabrics towards each other when subjected to the weight of the wearer of the shoes." The embodiment calls for the mat to be covered with a barrier material and closed to form a hermetically sealed chamber. In one form air may be left within the chamber, while in other forms, the air may be evacuated from the chamber or, replaced with a gas such as $CO_2$ in order to achieve a thermal coefficient of heat transfer that is lower than the ambient air. These structures are very poor shock absorbing devices returning little if any of the impact energy to the user and throwing said energy away as internal frictional heat.

In the present invention the drop threads consist of many separate filaments (not a single mono-filament as in the above inventions) each having a high tensile strength and being of a very small cross-section diameter in comparison with the prior art such that they are completely incapable of supporting any significant compression load by themselves. Thus the load supporting mechanism of the present invention is completely different from and greatly superior in load carrying capability, shock absorption, fatigue life, resiliency and beneficial life-like energy storage and return characteristics that are not even remotely possible with the above stated prior art.

Various gas containing foam materials have previously been sealed in flexible air-tight compartments, see for example, Rosenberg, U.S. Pat. No. 4,590,689 patented May 27, 1986 and Striegel, U.S. Pat. No. 3,914,881 patented Oct. 28, 1975. Foam products of this type pressurized even with "supergas" (Rudy U.S. Pat. No. 4,183,156 have not been successful because of several problems; (1) the tensile strength of even the best foam materials is not sufficiently strong and reliable to support the necessary inflation pressures over the life of a product to be used in footwear; (2) under heavy cyclic compression typical of the foot strike when walking or running, the walls individual cells constituting the foam structure abrade and tear as they move against one another and thus rapidly fail, resulting in an aneurysm and subsequent loss of pressure.

It is known that the highest possible quality foam, when used as a cushioning load supportive, compression member (i.e., mid-sole or insole) in athletic footwear such as running shoes, loses a substantial percent of its original cushioning properties within just a few miles of running, and at about 150 miles approximately 75% of the initial cushioning properties have been lost. The loss of cushioning is the result of internal break down of the cell walls of the foam. In this usage, the footwear does not become unusable because of said breakdown of the foam. The user simply is exposed to much greater shock forces. However, with a pressurized structure, breakdown of the foam structure results in formation of a high aneurysm or bump under the foot. Even the smallest failure of this type (i.e., $\frac{1}{4}$ to $\frac{1}{2}$" diameter) makes the product painful to use and therefore unusable.

The relatively high pressures which are required to provide the desired degree of springiness present very substantial problems with the peeling of the outer barrier film away from the distal surfaces of the double-walled fabric. It has been found that a fiber interface reinforcement and mechanical interlocking of the barrier film and the distal surfaces of the double-walled fabric is necessary to provide the required to provide the necessary peel strength at this location. It has been found that if the yarn which is used to form the double-walled fabric is in some way texturized or flannellized or made from at least 20% discontinuous filaments, so that there are numerous loops tendrils and projections of filamentary material projecting slightly from the distal surfaces of the fabric layers, that greatly improved the mechanical bonding that can be achieved. The texturizing can be provided for example, by abrading the distal surfaces of the double-walled fabric, by crimping the individual filaments which go to make up the yarn, by using a false twist in manufacturing the yarn, and the like. It is also desirable to use a yarn wherein the filaments are "dull" or "semi-bright". In a preferred embodiment the yarn from which the double-walled fabric is constructed is treated so that in the final product, the distal sides of the respective fabric layers present a great many tiny loops of outwardly projecting filamentary material. The individual filaments may be continuous in nature in the preferred embodiment so that the loops are anchored at both ends. Crimped filaments when combined into a yarn are also suitable for use according to the present invention.

The cloth or fabric structure which forms the tensile load bearing portion of the envelope may be constructed according to any known procedures including knitting and weaving. The double needle bar Raschel knit material is particularly satisfactory for use according to the present invention. Also material which is woven with a locking stitch is suitable for use.

The yarn from which the drop thread linked double-walled fabrics are constructed must be made of a high tensile strength material which is stable under the intended conditions of usage. A wide variety of synthetic yarn materials, may be used, however, filaments composed of nylon 66 have been found to have superior strength and durability characteristics.

Where the mechanical coupling or bonding sites on the distal sides of the fabric layers are provided by the use of discontinuous filaments in the yarn, those discontinuous filaments should preferably comprise at least approximately 20% of the filaments in the yarn.

In general the filaments utilized in the yarn according to the present invention have a denier per filament of from about 1-20 with a preferred range of from about 2-5. The individual filaments in general exhibit tensile strengths of from 2-10 grams per denier with a preferred range of from approximately 4-6 grams per denier. In general the number of filaments per yarn ranges from about 1-100 with the preferred range being from about 40-60. In general there are from approximately 1-8 yarns per tuft or strand with the preferred range being from about 3-5 yarns per strand. The preferred fabric is knitted with from about 200-1000 strands or tufts pounds per square inch of fabric and preferably from about 400-500 strands per square inch. The bulk density of the fabric is therefore in general in the range of from about 20,000-300,000 fibers per square inch - denier.

It has been found that if the filaments are heat set prior to being woven into the double-walled fabric the drop threads will tend to stand up so that a given point on one fabric layer will tend to remain axially aligned with the same given point on the opposed fabric layer. This is advantageous in construction. It is undesirable to have the individual fabric layers move, slip or lie-down in their own plaines relative to each other.

The construction of the internally pressurizable multi-layer envelope according to the present invention begins with the selection of an appropriate double-walled fabric which incorporates drop threads extending between the proximal surfaces of the respective fabric layers. The distal sides of the respective fabric layers are impregnated with a carefully metered quantity of bonding agent. In general the bonding agent is a material which will melt and in flow when heated so as to melt and bond with the outer semi-permeable barrier layer. The bonding or coupling agent may be applied using conventional application procedures including, for example, extrusion procedures, or calendaring and doctor blading. In general, however, the preferred method application is to provide the bonding agent in a sheet form and to melt and press the sheet into the distal sides of the fabric layers. The application of the bonding agent in a viscous molten sheet form by extrusion permits a very accurate control of the amount of bonding agent which is applied to any particular location. Accurate control is essential so as to avoid driving the bonding agent all the way through the fabric which would impair the flexibility of the drop threads or at worst, bond the opposite fabric layers together so the product could not be inflated and pressurized. In general the bonding agent should penetrate the fabric layer sufficient to securely bond to it, however not deep enough to pass entirely therethrough. In the preferred embodiment the quantity of bonding agent available to penetrate the fabric is controlled by controlling the thickness of the sheet of bonding agent which is applied to the fabric. Also, the heat is regulated so that hot spots do not occur and the depth of penetration does not vary from one area of the fabric to another due to changes in the fluidity of the bonding agent. A superior and preferred procedure presently used repeats this bonding agent application step.

The bonding agent impregnated fabric is then placed between two layers of semi-permeable membrane, and the semi-permeable membrane is bonded to the bonding agent and fabric layers, preferably by radio frequency heating. The temperature of the dies which are used to effect these laminations are preferably adjusted so that melting occurs at the interface between the bonding agent and the outer barrier membranes and not otherwise. The radio frequency power setting, pre-seal, seal, and cooling cycle and die temperatures (heat sinks) are preferably selected so as to minimize the amount of heating to the fabric and the barrier film. The part which results from the bonding of the semi-permeable membrane to the distal sides of the fabric is uniformly attached to a multiplicity of tiny connection sites so that the attachment of the semi-permeable membrane to the fabric is substantially continuous throughout the structure and completely free from pin-holes. The peel strength exhibited by this structure must be very high; i.e., in excess of 20 pounds per linear inch.

In the preferred method, the viscous or molten coupling or bonding material is extruded in sheet form onto the distal surfaces of the double-walled fabric or cloth, followed by squeeze rollers heated to the correct temperature so that they simultaneously chill and also drive the molten material into the distal fabric layers so as to penetrate and bond to the fabric, however only penetrating said fabric to a carefully controlled depth not to exceed the thickness of the fabric layers.

The perimeter of the structure is sealed by bringing the sheets of semi-permeable membrane together at the edge of the double-walled fabric and sealing the edges together around the entire perimeter. Sealing is conveniently accomplished by conventional techniques such as radio frequency welding, thermal impulse sealing, cementing, ultrasonic welding, magnetic particle sealing and the like. As a final step, the chamber, which is now defined between the walls of the double-walled fabric, is pressurized with a suitable large molecule gas. The gas is conveniently injected through the use of a needle with the injection port being sealed after the pressurization is completed is complete. The physical phenomenon which occur with inflation and diffusion are described for example in Rudy U.S. Pat. No. 4,340,626 patented Jul. 20, 1982 and attention is respectfully invited to this patent disclosure.

The pressurized structures according to the present invention enjoy wide utility in all sorts and varieties of footwear including boots, athletic shoes, everyday casual and leisure shoes, dress shoes, prosthetic shoes as well as in other devices including prosthetic devices, helmets and protective gear for recreational military industrial and aerospace applications, equipment controls such as bicycles handle grips, jack hammer handles, chain saws, hammers, bats, saddles and seats for bicycles, motorcycle and equestrian purposes, playing surfaces, athletic mats, flooring, work station pads, and the like.

BRIEF DESCRIPTION OF THE DRAWING

Referring particularly to the drawings for the purpose of illustration only and not limitation there is illustrated:

FIG. 1, a plan view of an insole according to the present invention;

FIG. 2, is an exploded cross-sectional view taken along line 2—2 in FIG. 1;

FIG. 3, a view similar to FIG. 2 showing the device in the assembled configuration.

Referring particularly to the drawings there is illustrated generally at 10 an insole according to the present invention. Insole 10 is composed of a composite structure in which an outer semi-permeable barrier layer 12 defines an pressure tight sealed chamber in which a tensile load-bearing structure which comprises a double-walled thread linked fabric indicated generally at 14 is positioned. The double-walled thread linked fabric structure 14 is composed of a first fabric layer 16, a second fabric layer 18 and drop threads 20. As indicated particularly in FIG. 2 the distal sides of fabric layers 16 and 18 are impregnated with a bonding agent to a depth which is slightly less than the total thickness of the fabric layers.

The distal sides 22 and 24, respectively, of the fabric layers are populated with a multiplicity of tiny mechanical attachment sites or points FIGS. 2, 29 and 30. These are shown as extending outwardly from the distal surfaces in FIG. 2 for the purpose of illustration, it being understood that they are in fact bound with the bonding agent. These attachment sites are provided by the filaments from which the fabric is constructed.

In the completed structure indicated for example in FIG. 3 the portion of the outer semi-permeable barrier layer 12 which is rendered molten for purposes of bonding with the bonding agent is indicated by molten zone 26. The application of heat to the envelope during manufacturing is preferably controlled so that molten zone 26 and the corresponding region of the bonding agent within the respective fabric layers are the only parts of the structure which become molten. The barrier layer 12 is hermetically sealed by means of a weld 28 which extends entirely around the periphery of the structure to achieve a pressure tight enclosure. The weld 28 is made as close as possible to the edge of the double-walled fabric 14 without trapping any of that fabric material in the weld itself. Any filaments trapped in the weld will probably cause the device to leak.

If desired, the distal sides of the fabric may be treated with chemical coupling agents such as silanes (DOW X16106) to improve adhesion. It has been found, however, that chemical coupling agents are not adequate alone to provide the necessary peel strength. A fiber interface reinforcement and mechanical interlock with the substance of the fabric is necessary. In general a peel strength of 20 pounds per linear inch is the absolute minimum necessary to accomplish the desired function. Peel strengths in excess of 23 pounds per linear inch are preferred. At peel strengths in excess of approximately 35 pounds per linear inch the tensile fibers or drop threads fail first.

In a less preferred procedure the distal sides of the fabric 14 are flame treated to oxidize the surface so as to oxidize the surface and provide a multiplicity of mechanical attachment sites. It has been found, however, that flame treatment reduces the strength of the fabric beyond a satisfactory level.

Structures according to the present invention having thicknesses in the range of 0.100" to 0.500" have been successfully inflated to over 180 psi and have retained those pressures for several weeks without failure.

In general the preferred barrier film material is polyurethane as described in the above identified prior Rudy U.S. patents the other elastomeric barrier films as identified in said patent are also applicable. The bonding agent is conveniently the same urethane material which is used as the outer barrier layer. The coupling agent is preferably provided in the form of a freshly extruded sheet which is immediately hot pressed in the molten state, into the distal sides of the fabric. The fabric is composed of heat set filaments so that the fabric layers remain in accurate registry with respect to one another during handling and formation. Very satisfactory results have been achieved using filaments having a denier of 3, a tensile strength of 3 grams per denier, approximately 40 filaments per yarn and 3 yarns per tuft or strand with the fabric being composed of approximately 440 strands or tufts per square inch. It has been found that using less than 3 yarns per tuft tends to impair the wear-life of the resulting structure. When radio frequency heating has been utilized to bond the semi-permeable layer to the distal sides of the double-walled fabric it has been found that heating the dies to between approximately 100 and 150 degrees Fahrenheit and utilizing a radio frequency of 27.12 megahertz, achieves the desired bonding without impairing the rest of the structure. Using filaments composed of nylon 66 material have been found to produce the preferred tensile strength, wear and durability characteristics. Very satisfactory results have been achieved using a continuous filament yarn which has been texturized with a false twist.

What has been described are preferred embodiments and modifications in which changes may be made without departing from the spirit and scope of the accompanying claims.

What is claimed is:

1. An inflated and pressurized flexible insert construction for articles of footwear wherein said insert is subjected to long term compression, cyclic and impact fatigue loads and operates to cushion such loads resiliently and return at least some of the energy of an impact load, comprising an outer sealed envelope of a semi-permeable elastomeric material which is substantially impervious to large molecule size gasses and permeable to oxygen, said envelope including an outer upper and lower surface at least a portion of which outer surfaces are in a flat and parallel relative orientation and an inner surface, at least a portion of said envelope including a peripheral seal formed between facing portions of the inner surface of said envelope, a fabric including first and second spaced fabric layers each including an outer surface, means for bonding said outer surfaces of said first and second fabric layers to said inner surface of said envelope, the bond between said outer surfaces of said first and second fabric layers to said inner surface of said envelope being at least about 20 pounds per linear inch, flexible means extending between said spaced fabric layers for restraining the movement of said fabric layers away from one another beyond a predetermined distance thereby maintaining the relatively flat orientation of said portions of said outer upper and lower surface portions of said envelope, said flexible means being incapable in itself of cushioning compressive loads and impact loads to which said insert is exposed during use, at least one gas present in said envelope to pressurize said envelope such that substantially all of the resistance of said envelope to compression is provided by the gas within said envelope, and said peripheral seal being essentially free of fabric material that would allow transport of said at least one pressurizing gas through said peripheral seal.

2. The inflated and pressurized insert construction for articles of footwear of claim 1 wherein said flexible means for restraining holds said fabric layers in substantially parallel relationship to one another.

3. The inflated and pressurized insert construction for articles of footwear of claim 1 wherein said envelope is substantially free of incompressible areas.

4. The inflated and pressurized insert construction for articles of footwear of claim 1 including means for mechanically bonding said first and second fabric layers to said inner surface of said envelope.

5. The inflated and pressurized insert construction for articles of footwear of claim 1 wherein the surfaces of said fabric layers adjacent to said inner surface of said envelope include a multiplicity of minute tendrils, said tendrils forming attachment sites for bonding said fabric layers to said inner surface of said envelope to form a substantially continuous mechanical bond between said inner surface and the surfaces of said fabric layers.

6. The inflated and pressurized insert construction for articles of footwear of claim 1 wherein said flexible means for restraining the movement of said fabric layers is of sufficient strength to hold said fabric layers at said predetermined distance when the gas pressure in said chamber exceeds approximately 150 pounds per square inch.

7. The inflated and pressurized insert construction for articles of footwear of claim 1 wherein said flexible means for restraining the movement of said fabric layers comprises filaments extending between and anchored to said fabric layers.

8. The inflated and pressurized insert construction for articles of footwear of claim 1 wherein said fabric layers are impregnated with a bonding agent to a depth which is less than about their thickness, said bonding agent being bonded to said outer barrier layer.

9. An inflated and pressurized flexible insert construction as set forth in claim 8 wherein said elastomeric material is a polyurethane material and said bonding agent is of the same material as said elastomeric material.

10. An inflated and pressurized flexible insert construction as set forth in claim 1 wherein said fabric is a double needle bar Raschel knit material.

11. An inflated and pressurized flexible insert construction as set forth in claim 1 wherein said insert both cushions an impact load from an impact load creating member and absorbs energy and returns up to 90% of the absorbed cushioned energy to the impact load creating member.

12. An inflated and pressurized flexible insert construction as set forth in claim 1 wherein said fabric includes a yarn comprising filaments which are dull or semi-bright finished.

13. An inflated and pressurized flexible insert construction as set forth in claim 1 wherein said fabric includes a yarn which is texturized.

14. An inflated and pressurized flexible insert construction as set forth in claim 13 wherein said fabric includes a yarn having filaments which are heat set.

15. An inflated and pressurized flexible insert construction as set forth in claim 1 wherein the outer surfaces of said fabric are flannelized.

16. An inflated and pressurized flexible insert construction as set forth in claim 15 wherein said fabric includes a yarn having filaments which are heat set.

17. An inflated and pressurized flexible insert construction as set forth in claim 1 wherein said fabric includes a yarn comprising at least 20% discontinuous filaments.

18. An inflated and pressurized flexible insert construction as set forth in claim 17 wherein said fabric includes a yarn having filaments which are heat set.

19. An inflated and pressurized flexible insert construction as set forth in claim 1 wherein said fabric includes a nylon yarn.

20. An inflated and pressurized flexible insert construction as set forth in claim 1 wherein said flexible means includes filaments composed of from about 200 to 1,000 strands or tufts per square inch of fabric.

21. An inflated and pressurized flexible insert construction as set forth in claim 1 wherein said flexible means of said fabric has a bulk density of between 20,000 to 300,000 fibers or filaments per square inch.

22. An inflated and pressurized flexible insert construction as set forth in claim 1 wherein said fabric includes a yarn having filaments of a denier per filament of from between 1 and 20.

23. An inflated and pressurized flexible insert construction as set forth in claim 1 wherein said fabric includes a yarn having filaments of a denier per filament of from between 3 and 5.

24. An inflated and pressurized flexible insert construction as set forth in claim 1 wherein said fabric includes a yarn having filaments of a tensile strength per filament of from between 2 and 10 grams per denier.

25. An internally pressurized multi-layered envelope capable of withstanding long term compression, cyclic and impact fatigue loads to provide cushioning in response to such loads, comprising:

a hermetically sealed outer covering defining a pressurized chamber, said outer covering including an inner surface and comprising a semi-permeable elastomeric material which is substantially impervious to large molecule size gasses and slightly permeable to oxygen;

a compressible fabric structure within said chamber, said compressible structure being substantially coextensive with said chamber and comprising a first fabric layer, a second fabric layer normally spaced from said first layer, and compressible means for restraining said fabric layers from separating more than a predetermined distance;

said compressible means being incapable of providing compression resistance to said envelope;

said first and second fabric layers each including an outer surface portion which is in facing relation with and in contact with the inner surface of said outer covering, said sealed outer covering including at least a portion which forms a peripheral seal provided between the facing inner surfaces of said outer covering;

means for forming a substantially continuous mechanical bond between said outer covering and said first and second fabric layers and a bonding agent which is impregnated into said fabric layers to a depth which is less than their thickness;

said means for forming said bond including a multiplicity of tendrils and/or loops extending from the outer surface of each of said first and second fabric layers, a large molecule sized gas in said chamber, said envelope being pressurized to a pressure of at least 2 pounds per square inch whereby substantially all of the resistance of said envelope to compression is provided by the gas pressure within said chamber, and said peripheral seal being essentially free of fabric material of said compressible structure to prevent loss of gas through said peripheral seal.

26. An internally pressurized multi-layered envelope of claim 25 wherein said envelope is in the configuration of an insole having a substantially uniform thickness, and said envelope being free of incompressible areas throughout the portions of said insole which are subjected to said loads.

27. An internally pressurized multi-layered envelope as set forth in claim 25 wherein said compressible fabric structure is a double needle bar Raschel knit material.

28. An internally pressurized multi-layered envelope as set forth in claim 25 wherein said envelope both cushions an impact load from an impact load creating member and absorbs energy and returns up to 90% of the absorbed cushioned energy to the impact load creating member.

29. An internally pressurized multi-layered envelope as set forth in claim 25 wherein said fabric structure includes a yarn comprising filaments which are dull or semi-bright finished.

30. An internally pressurized multi-layered envelope as set forth in claim 25 wherein said fabric structure includes a yarn which is texturized.

31. An internally pressurized multi-layered envelope as set forth in claim 30 wherein said fabric structure includes a yarn having filaments which are heat set.

32. An internally pressurized multi-layered envelope as set forth in claim 25 wherein the outer surface portions said fabric structure are flannelized.

33. An internally pressurized multi-layered envelope as set forth in claim 32 wherein said fabric structure includes a yarn having filaments which are heat set.

34. An internally pressurized multi-layered envelope as set forth in claim 25 wherein said fabric structure includes a yarn comprising at least 20% discontinuous filaments.

35. An internally pressurized multi-layered envelope as set forth in claim 34 wherein said fabric structure includes a yarn having filaments which are heat set.

36. An internally pressurized multi-layered envelope as set forth in claim 25 wherein said fabric structure includes a nylon yarn.

37. An internally pressurized multi-layered envelope as set forth in claim 25 wherein said compressible means includes filaments composed of from about 200 to 1,000 strands or tufts per square inch of fabric structure.

38. An internally pressurized multi-layered envelope as set forth in claim 25 wherein said compressive means of said fabric structure has a bulk density of between 20,000 to 300,000 fibers or filaments per square inch.

39. An internally pressurized multi-layered envelope as set forth in claim 25 wherein said fabric structure includes a yarn having filaments of a denier per filament of from between 1 and 20.

40. An internally pressurized multi-layered envelope as set forth in claim 25 wherein said fabric structure includes a yarn having filaments of a denier per filament of from between 3 and 5.

41. An internally pressurized multi-layered envelope as set forth in claim 25 wherein said fabric structure includes a yarn having filaments of a tensile strength per filament of from between 2 and 10 grams per denier.

* * * * *